United States Patent Office 2,898,075
Patented Aug. 4, 1959

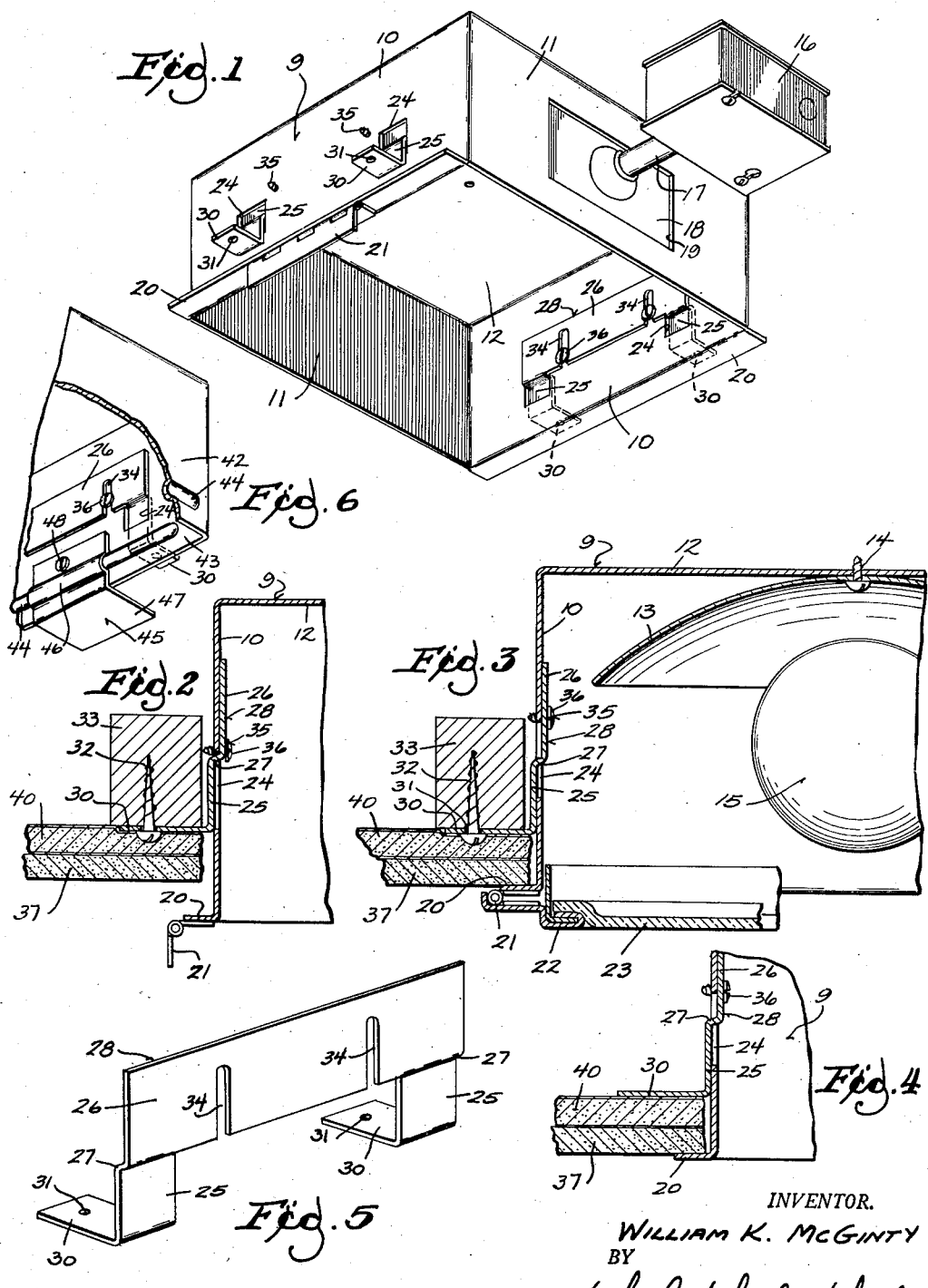

2,898,075

MOUNTING BRACKET FOR A RECESSED CEILING FIXTURE

William K. McGinty, Fort Atkinson, Wis., assignor to Thomas Industries Inc., Fort Atkinson, Wis., a corporation of Delaware Application August 19, 1954, Serial No. 450,951

12 Claims. (Cl. 248—343)

This invention relates to a mounting bracket for a recessed ceiling fixture.

It is the object of this invention to provide a simplified mounting bracket for a recessed ceiling fixture, or the like, in which the bracket is applicable universally to new and old ceiling constructions whether the ceiling opening be provided with paired headers at opposite sides of the opening or the lath and plaster bordering the ceiling opening provides the sole means for supporting the fixture.

The invention consists in providing a fixture box having side openings with a mounting bracket having a portion slidable upon the inside face of the box wall and legs disposed in said openings to provide a closure therefor, the legs being provided with feet projecting through the wall openings for engagement either with a header or the lath and plaster bordering the ceiling opening.

The wall of the fixture box is also provided with a flange generally parallel to the bracket feet and with respect to which the bracket feet are movable in the manner of a clamp. Thus the bracket and flange may cooperate in clamping the box to the lath and plaster margin bordering the ceiling aperture in which the fixture is disposed.

In the drawings:

Fig. 1 is a bottom perspective view of a recessed ceiling fixture embodying the invention.

Fig. 2 is a fragmentary vertical cross section taken through an embodiment of my invention, the fixture box being shown in the first stage of its application to new ceiling construction.

Fig. 3 is a fragmentary cross sectional view similar to that shown in Fig. 2, showing the final stage of the application of the device to new ceiling construction.

Fig. 4 is a fragmentary cross sectional view similar to that of Fig. 3, but showing the device clamped to the lath and plaster which form the margins of an opening cut in an old ceiling.

Fig. 5 is a perspective view of the mounting bracket per se.

Fig. 6 is a fragmentary bottom perspective view of a modification of the structure shown in Fig. 1.

The recessed ceiling fixture comprises a box 9 having side walls 10, end walls 11 and a top 12 from which a reflector 13 may be suspended by means of the bolt 14 (Fig. 3). A light bulb 15 is conventionally positioned beneath the reflector. Electric current is supplied to the light bulb through a junction box 16 supported in spaced relationship to the end wall 11 on a conduit pipe 17 supported on a closure plate 18 mounted over opening 19 in one end wall 11 of the box. The details of construction of the junction box, its mounting, and the electrical connections from the junction box to the light bulb will not be further described as these constitute no part of the present invention.

The side walls 10 of the box may be provided with out-turned flanges 20 along their lower margins. One of the flanges 20 may be provided with a hinge 21 on which the door frame 22 may be hung. The door frame carries a translucent glass 23, as is conventional.

The side walls 10 of the box are provided with apertures 24 spaced above the level of flanges 20 and normally closed by the legs 25 of a mounting bracket 28 which has a plate portion 26 slidable upon the inner surface of the wall 10. The legs 25 are outwardly offset in a plane parallel to the plane of plate 26 a distance substantially equal to the thickness of the wall 10. Legs 25 are desirably formed from the same sheet of material as the plate 26 and connected thereto on the bends 27. The apertures 24 and legs 25 are desirably of the same outline so that the legs constitute closures for the openings. In the exemplification disclosed the openings and legs are rectangular. The legs close the openings in all positions of the bracket.

The legs are provided at their outer ends with feet 30 which are at substantially right angles to the legs and parallel to the box wall flanges 20. The feet are desirably provided with screw openings 31 to receive the wood screws 32 for securing the feet to the headers 33 as hereinafter explained.

The plate mounting portion 26 of the bracket is provided with slots 34 which constitute ways upon which the bracket is slidable on the sheet metal screws 35 which have heads 36 within the box and engaged over the margins of the slots. By tightening the screws 35 the plate may be fastened to the box wall in any selected position.

As best shown in Figs. 2 and 3 the plate portion 26 of the bracket slides on the inside of wall 10 and the legs 25 slide on the outside of the wall 10. When the bracket is raised to its extreme position (Fig. 2) where bend 27 engages the upper edge of aperture 24, the lower margins of the legs still engage the outside of the wall to insure closure of the openings 24 and stability of the bracket. When the bracket is moved to a relatively lower position (Fig. 3) the portions of the plate 26 above the legs 25 cooperate with the legs in closing the openings 24. The range of movement of the bracket on its ways is such that the legs 25 can be dropped until bends 27 engage the lower edges of openings 24. In that position the legs 25 will lie entirely along the outside of wall 10 and plate 26 will constitute the entire closure for openings 24. In all intermediate positions the plate and legs combine in forming said closure.

As shown in Figs. 2 and 3 the recessed box may be applied to new ceiling construction which may conventionally include the headers 33 at opposite sides of the ceiling opening. Screws 35 are loosened to slide the bracket 28 to its extreme upper position. Feet 30 of the mounting brackets may then be screwed against the undersurface of the headers. The lath 40 and plaster 37 may then be installed, there being ample clearance between the feet 30 and flange 20 to admit the lath and plaster as shown in Fig. 2. The box may then be raised as shown in Fig. 3 to engage the flanges 20 with the lower face of the plaster 37, and screws 35 tightened to secure the mounting bracket. In this position the lath and plaster is clamped between the feet 30 and flange 20.

As shown in Fig. 4, the device may be mounted in an old ceiling simply by cutting a hole in the ceiling and supporting the box entirely on the lath and plaster. For this purpose the bracket 28 may be removed from its ways, as by grasping the plate 26 and withdrawing the bracket into the box 9 to clear the legs 25 and feet 30 from interference with the ceiling material 37, 40, the box 9 raised in the ceiling opening until its flanges 20 engage the lower face of plaster 37, the brackets 28 re-inserted to dispose feet 30 above the lath 40, and the screws 35 tightened to clamp the lath and plaster between the feet 30 and flange 20.

Flange 20 may be integral with the box wall 10, as in the embodiment of Figs. 1 through 5. In the modification of Fig. 6 the box walls 42, 43 have straight edge margins, without flanges, to facilitate installation of the box in new ceiling construction. The wall margins may be reinforced by ribs 44 in the absence of flanges.

For application of the box to old ceiling construction, in the manner shown in Fig. 4, I provide a removable angle bracket comprising a plate 45 having a channel 46 engaging over bead 44 and a flange 47 which engages the box wall edge and projects therebeyond at a right angle to plate 45 for cooperation with foot 30 of plate 26 as hereinbefore explained. Screw 48 removably clamps plate 45 in position.

I claim:

1. The combination with an electric fixture box having a substantially open bottom and a side wall having laterally spaced openings respectively elongated toward the box bottom, of a mounting bracket for the box comprising a plate within the box spanning between said laterally spaced openings and in face relation with and slidable along the inner surface of said wall in the direction of opening elongation, said plate being provided with corresponding laterally spaced legs extending through said openings for engagement with support means outside said box, and means accessible from inside the box for releasably fastening said bracket to said wall in any relative position of sliding movement of the bracket with respect to said wall.

2. The device of claim 1 in which each said leg comprises a strap of substantially the same width as its wall opening and at least as long as its opening whereby said leg fills said opening to constitute a closure therefor when the bracket is moved to its extreme position away from the box bottom.

3. The device of claim 1 in which each said leg comprises a portion parallel to the plane of the plate and is laterally offset from said plate a distance substantially equal to the thickness of the box wall whereby said plate slides on the inside surface of said wall and said leg slides on the outside surface of said wall during normal adjustment of the bracket with respect to said opening.

4. The device of claim 3 in which the respective legs and plate are connected by laterally extending means providing a shoulder engageable with an edge of the wall forming the opening, said shoulder comprising means to limit movement of the bracket.

5. The combination with a box having an open bottom and a side wall with an opening therein, of a mounting bracket for the box comprising a mounting portion within the box in face relation to the inner surface of the wall and slidable therealong, a leg extending from said mounting portion into and through said opening, said leg being provided with a foot portion outside said box and first means for fastening said foot portion to a first support means outside the box, said opening being elongated toward the box bottom for adjustable movement of the bracket toward and away from the box bottom, and means for releasably fastening said mounting portion of said bracket to said wall to adjustably position the box with respect to the foot portion outside said wall, said foot portion being at substantially a right angle to said leg, said box wall being provided with an outturned flange substantially parallel to said foot and towards which said foot is movable with said mounting bracket whereby an alternative second support means may be clamped between said foot and flange for the support of said box independently of said first means.

6. A mounting bracket comprising a plate, a leg laterally offset from the plane of the plate but parallel thereto and a connection between said leg and plate spanning said offset, and a foot extending substantially at a right angle to said leg.

7. The device of claim 6 in which said plate is provided with an additional leg laterally spaced from the leg first mentioned and with a foot at substantially a right angle to said additional leg.

8. A recessed fixture box having mounting bracket means for application to a ceiling opening bordered by ceiling material, said box comprising opposite side walls, flanges extending outwardly from the lower margins of said walls, and openings in said walls spaced upwardly from said flanges, and mounting brackets comprising plates mounted within said box and in face relation to and slidable with respect to the inner surfaces of said walls, said brackets having legs extending into said openings and being provided with foot portions outside said box and extending substantially parallel to said flanges, said openings being upwardly elongated to permit movement of said legs in said openings toward and away from said flanges, and means for releasably fastening the mounting bracket plates to said walls to adjustably position said foot portions with respect to said flanges, said foot portions and flanges comprising means for engaging ceiling material therebetween to support the box, said mounting bracket plate constituting means by which the legs and feet outside the box may be withdrawn through said openings into said box to clear the margins of said ceiling material in the course of inserting the box into said ceiling opening.

9. The device of claim 8 in which said foot portions are provided with screw receiving apertures.

10. The device of claim 8 in further combination with angle brackets having plates fastened in face relation to the side walls of the box and to which said flanges are integrally connected.

11. A recessed fixture box adapted for mounting in a wall recess having fixture box supporting structure, said box comprising a wall having an elongated aperture, a mounting bracket comprising a first portion inside the box and slidable along the inside of said wall and a second portion outside the box adapted for cooperation with said fixture box supporting structure and movable with said first portion in the direction of aperture elongation, and means accessible from inside the box for releasably fastening said bracket to said wall for adjustably positioning said bracket with respect to said wall.

12. The device of claim 11 in which said bracket comprises means closing said wall aperture in all positions of said bracket.

References Cited in the file of this patent

UNITED STATES PATENTS

| | | |
|---|---|---|
| 1,567,863 | Sargent et al. | Dec. 29, 1925 |
| 2,305,015 | Langer | Dec. 15, 1942 |
| 2,590,391 | Elmore | Mar. 25, 1952 |
| 2,605,012 | Duncan | July 29, 1952 |
| 2,614,785 | Versen | Oct. 21, 1952 |
| 2,680,192 | Webb | June 1, 1954 |
| 2,684,220 | Beber | July 20, 1954 |